UNITED STATES PATENT OFFICE.

HENRY H. BEACH, OF ROME, NEW YORK.

IMPROVEMENT IN PROCESSES FOR PREPARING PEASE.

Specification forming part of Letters Patent No. 223,024, dated December 30, 1879; application filed April 8, 1879.

*To all whom it may concern:*

Be it known that I, HENRY H. BEACH, of Rome, in the county of Oneida and State of New York, have invented a certain new and useful Improvement in the Preparation of Pease for a Table-Drink, of which the following is a specification.

One of the greatest drawbacks, if not indeed the greatest drawback, to the more extensive use of pease for a table-drink is the aromatic principle or peculiar bitter aromatic property of natural dried pease, which is at all times perceptible in pease prepared according to the hitherto customary practice, and is extremely unpleasant to the taste of many.

It is my object to remove this extractive matter and leave the pease sweet and pleasant to the taste, so that when roasted and ground they may form the basis of an agreeable and acceptable table-drink.

After considerable experiment, instituted with a view to extracting the flavor from the raw pea, I find that it can best be done by the use of boiling water and in the following way: I take the natural dried pease, and I boil them in water for about one hour and a half, or nearly to the point of solution of continuity of the pease; in other words, I boil them as long as is practicable without carrying the process to that point where the pease will break up or boil to pieces. It is essential that they retain their globular form and sufficient cohesion to bear subsequent roasting. At this point the water is drawn off. It will be found that by this time the peculiar aromatic principle has been in great measure removed from the pea. To such an extent is the water impregnated with the principle that it will make excellent pea-soup. It is indeed a liquid extract which, when concentrated to about one-fourth its bulk, forms a concentrated extract for flavoring soups, or for the preparation of pea-soup by the addition of any suitable farinaceous powders. After separating the pease from the water I place them, while still moist, in a suitable roasting pan or apparatus, and roast or brown them in the usual way.

The pea thus prepared, while having the same globular form as the ordinary browned or roasted pea, is readily distinguishable from the latter. It has not the rank flavor of the ordinary roasted pea. On the contrary, its flavor is delicate, and possesses little of the distinctive pea property. It moreover is far less brittle, and crumbles or breaks with great ease.

Pease thus prepared and roasted can be ground and used as coffee is, for a table-drink, or, for the same purpose, may be mixed freely and in quantity with other substances for making table-drink.

In conclusion, I would state that I am aware that pease have before been steamed preparatory to being browned or roasted. The steaming process, however, has little or no effect in extracting the pea principle. It softens and cooks the pea, but does not remove its flavor to any extent.

I am also aware that pease have been softened by cold water, as in Andre's process, patented July 23, 1861, or have been steamed, as in the process described in British Patent No. 920 of 1855. In each case, however, that operation was merely preliminary to reducing the pea to pea-meal, in which the pea flavor is to be preserved as far as possible and not destroyed or removed.

Having described my improvement, I state my claim as follows:

1. The process described of preparing pease, which consists in first boiling the pease nearly to the point of solution of continuity, to extract as far as possible their peculiar aromatic principle, then separating the pease from the liquid, and then browning or roasting them, as set forth.

2. As a new article of manufacture, boiled and browned or roasted pease destitute of the flavor and excessive hardness of the ordinary roasted pea, and possessing the soft or crumbling quality, as set forth.

In testimony that I claim the foregoing as my own I hereunto affix my signature in presence of two witnesses.

HENRY H. BEACH.

Witnesses:
G. W. BALLOCH,
M. BAILEY.